Oct. 13, 1959    A. WEISS    2,908,438
REENFORCED CARRYING HANDLE FOR TIED TOGETHER CONTAINERS
AND METHOD OF PRODUCING THE SAME
Filed Dec. 21, 1955    2 Sheets-Sheet 1
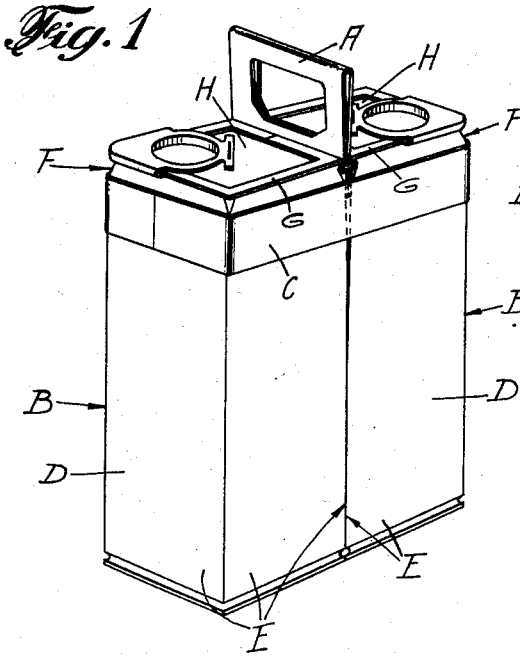
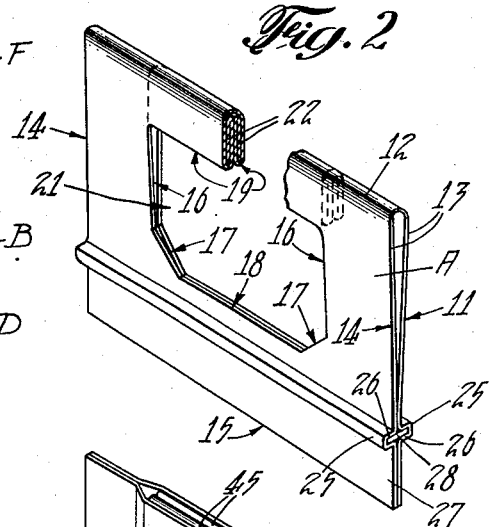
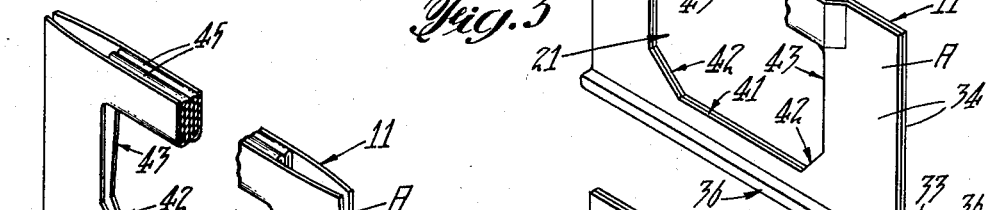
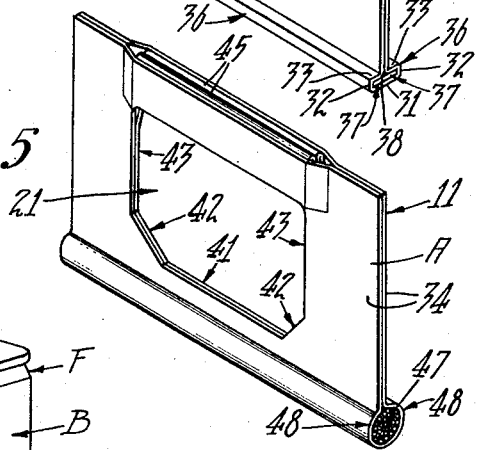
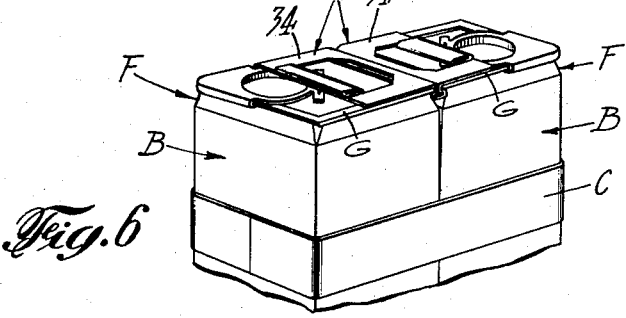
INVENTOR.
ADOLPH WEISS
BY
Charles H. Erne
Leland D. McCann
George W. Reiber
ATTORNEYS Oct. 13, 1959  A. WEISS  2,908,438
REENFORCED CARRYING HANDLE FOR TIED TOGETHER CONTAINERS
AND METHOD OF PRODUCING THE SAME
Filed Dec. 21, 1955  2 Sheets-Sheet 2
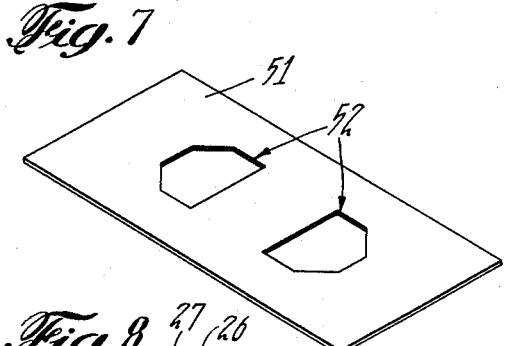
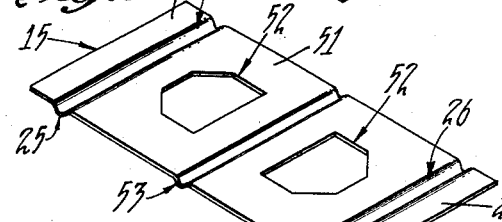
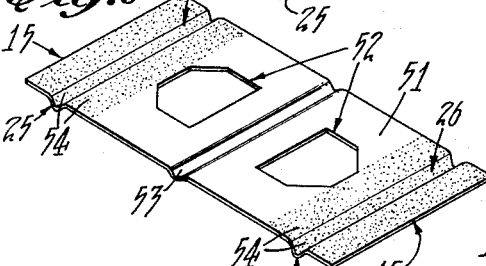
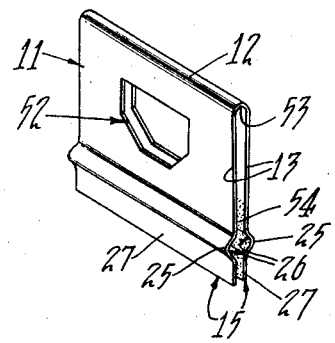
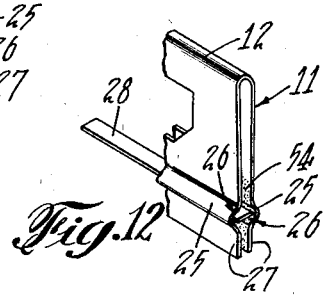
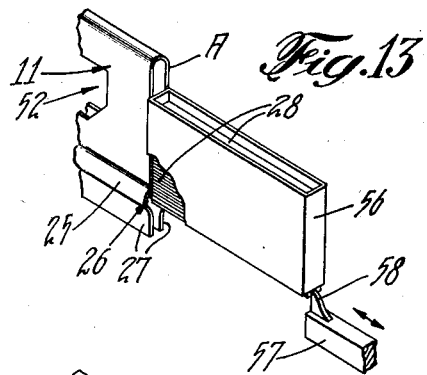
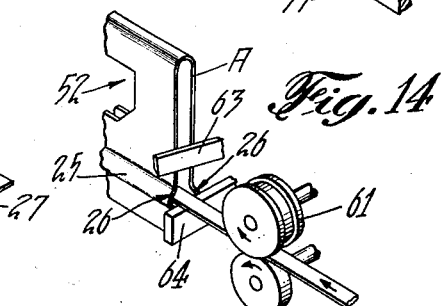
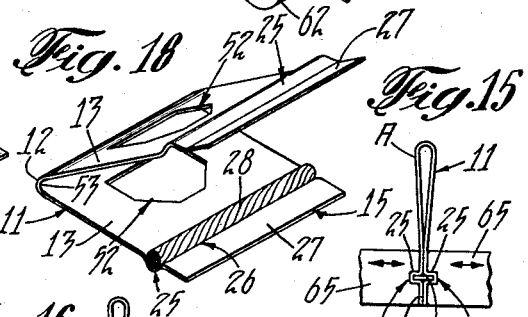
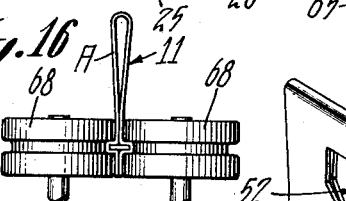
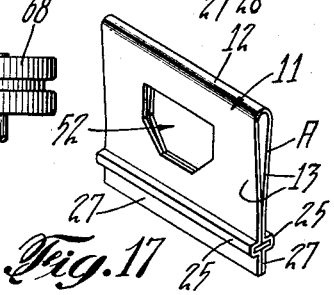
INVENTOR.
ADOLPH WEISS
BY Charles H. Erne
Leland R. McCann
George W. Raber
ATTORNEYS

United States Patent Office 2,908,438
Patented Oct. 13, 1959

2,908,438

REENFORCED CARRYING HANDLE FOR TIED TOGETHER CONTAINERS AND METHOD OF PRODUCING THE SAME

Adolph Weiss, Brooklyn, N.Y., assignor to American Can Company, New York, N.Y., a corporation of New Jersey Application December 21, 1955, Serial No. 554,483

6 Claims. (Cl. 229—52)

The present invention relates generally to devices for carrying a plurality of tied together containers and the like and has particular reference to a novel handle having laterally disposed support members which are reenforced to support the containers and a method of producing the same.

Rectangular fibre containers for milk, fruit juices and the like products, usually sold as individual containers, are often merchandized in groups of two or more tied together to provide a unitary package. A handle is sometimes provided to carry such packages. Often these handles are separate elements and are formed with various forms of support members for supporting the containers. Some of these support members are of rather complicated construction, thereby adding to the cost of production. Other support members are of too flimsy construction. Still others tend to cause accidental separation of the handle from the package.

An object of the instant invention is the provision of a carrying handle for a group of tied together containers, which overcomes these difficulties by the provision of support members which are of comparatively simple construction and yet are stiff and rigid enough so that they readily support the containers and securely hold the handle in place against accidental separation.

Another object is the provision of a method of producing such a handle rapidly and economically.

Another object is the provision of such a carrying handle which is formed in such a manner as to retain it in position against horizontal displacement as well as vertical displacement.

Another object is the provision of such a carrying handle which is formed so as to lie flat against the tops of the containers to allow stacking the packages on top of each other without interference with the handle.

Numerous other objects and advantages of the invention will be apparent as it is better understood from the following description, which, taken in connection with the accompanying drawings, discloses a preferred embodiment thereof.

Referring to the drawings:

Figure 1 is a perspective view of a pair of containers arranged in juxtaposed relation and tied together for carrying as a unitary package by a handle embodying the instant invention;

Fig. 2 is an enlarged perspective view of the handle shown in Fig. 1, with parts broken away;

Figs. 3, 4 and 5 are views similar to Fig. 2 and showing modified forms of the handle;

Fig. 6 is a fragmentary, perspective view similar to Fig. 1 and showing a modified form of handle disposed in collapsed position to permit stacking of the packages on top of each other;

Fig. 7 is a perspective view of a flat blank from which the handle shown in Fig. 2 is made in accordance with the steps of the instant invention;

Figs. 8, 9 and 10 are perspective views of the blank shown in its various stages of being formed into a handle;

Fig. 11 is a perspective view of one form of reenforcing member for the handle;

Fig. 12 is a fragmentary perspective view of the handle as shown in Fig. 10 and the reenforcing member of Fig. 11 in position in the handle just prior to final assembly therewith;

Figs. 13 and 14 are fragmentary perspective views of the handle as shown in Fig. 10 and two different mechanisms for assembling the reinforcing member of Fig. 11 with the handle;

Figs. 15 and 16 are end elevations of the assembled handle and reenforcing member and two different mechanisms for securing these parts together;

nisms for securing these parts together.

Fig. 17 is a perspective view of the finished reinforced handle; and

Fig. 18 is a perspective view of a partially formed reenforced handle showing a different form of reenforcing member and a different method of assemblage with the handle.

As a preferred or exemplary embodiment of the instant invention Figs. 1 and 2 of the drawings illustrate a handle A for carrying a pair of fibre milk containers B disposed in juxtaposed relation and tied together by a surrounding fibre band C. The containers B preferably are of the character disclosed in United States Patent 2,085,979, issued July 6, 1937, to John M. Hothersall on Container. Such containers comprise a rectangular body D having flat side walls E which at their upper ends are formed with necked-in portions F and an immediately adjacent outwardly or laterally projecting peripheral end seam or ledge G which includes the peripheral edge of and secures in place a flat top member or disc H.

In the juxtaposed relation of the containers B, two side walls E are directly opposite each other in substantially contiguous relation and the corresponding sections of the ledges G for these side walls extend transversely of the package with their outer edges parallel and substantially coincident.

The tie band C preferably is made from a single piece of fibre material having its end portions overlapped against one side wall E of one of the containers B as shown in Fig. 1. The overlapped end portions are secured together in any suitable manner, as by wire staples or by adhesive interposed between the end portions, to hold the band in place and to thus tie the containers together.

The handle A (Fig. 2) preferably comprises a double thickness, rectangular shaped carrying member 11 made from a one piece, heavy stiff, paper or cardboard blank folded in half along a fold line 12 disposed along the top or upper edge of the member and thereby providing a pair of oppositely disposed, depending legs 13. The legs 13, inwardly of their two side or vertical edges 14 and their lower or bottom horizontal edges 15 are cut through along connecting lines of severance 16, 17, 18 and the material of the member defined by these lines of severance and still connected to the member along fold lines 19 spaced inwardly from the top fold line 12, is folded inwardly to provide a pair of coincident openings 21 in the member and a pair of three ply juxtaposed handle bars 22 adjacent the top fold line 12 of the member for carrying purposes.

Between the lower defining line 18 of the openings 21 and the bottom edges 15 of the member 11, each leg 13 is provided with an outwardly projecting or laterally or horizontally extending bead or support flange or element 25 (Fig. 2) which sets off a channel 26 on the inside face of the leg. The two beads 25 in the two legs 13 are oppositely disposed and are parallel with the bottom edges 15 of the legs and extend the full width of the legs. Below the beads 25, the lower marginal edge portions of the legs 13 hang down and are adhesively secured together to provide a stiff pendant 27.

The beads 25, laterally or horizontally projecting from opposite sides of the carrying member 11 are utilized to support and carry the weight of the juxtaposed, tied-together containers B when the handle A is assembled with the containers. In order to insure sufficient strength and rigidity in these support elements or beads 25, they are reenforced by a reenforcing element 28 (Fig. 2) which is carried in the juxtaposed channels 26 set off by the beads. This reenforcing element 28 extends the full width of the member legs 13 and preferably is secured in place by a suitable adhesive or other bonding or securing medium. The reenforcing element 28 preferably is a rectangular bar or strip of heavy, stiff, paper or cardboard, but also may be made of heavy cord, metal wire, wood, plastic, or other suitable material.

When the handle A is in carrying position on the two juxtaposed containers B of the unitary package, it is disposed between the substantially coincident ledges G of the containers as shown in Fig. 1 with its rectangular shaped member 11 extending above the tops of the containers and with the reenforced beads or support elements 25 disposed beneath the ledges G and in the space provided between the adjacent necked-in portions F of the containers as shown in Fig. 1. In this position of the handle A the pendant 27 extends down between and in engagement with the contiguous side walls E of the two juxtaposed containers and terminates below the top edge of the tie band C to prevent edgewise lateral displacement of the handle from between the containers. The band C preferably is located adjacent the top edges of the containers for this purpose.

In lifting the package by the handle A, the two containers B are supported entirely on the two oppositely disposed laterally or horizontally projecting reenforced beads or support elements 25 which are engaged beneath the ledges G of the containers as shown in Fig. 1. The reenforcing element 28 extends horizontally from the channel 26 of one bead 25 to the opposite channel of the opposing bead and thereby connects and ties the beads 25 together and reenforces them so that they are stiff and rigid and held against flexing or hinging relative to the legs 13 of the carrying member. This insures equal distribution of the weight of the package and further insures against separation of the handle from the package by vertical displacement.

In a modified form of the handle A as illustrated in Fig. 3 the blank from which the carrying member 11 is made is folded in half in such a manner as to locate the folded portion at the bottom edge of the handle instead of at the top edge as in the preferred form in Fig. 2. This bottom fold of the carrying member comprises a flat horizontal wall portion 31 which at its outer edges merges into upwardly extending short wall portions 32 which in turn merge into inwardly extending horizontal wall portions 33 which meet midway between the vertical wall portions 32 and merge into vertical upwardly extending contiguous legs 34 of the carrying member. These legs 34 are adhesively or otherwise secured together to produce a rigid double walled carrying element. The wall portions 31, 32, 33 thus set off along the bottom edge of the carrying member 11 a pair of oppositely disposed beads or support elements 36 which extend horizontally and laterally from opposite sides of the carrying member to support the containers B in the same manner as effected by the beads 25 of the preferred form of the invention.

The support beads 36 of this modified form of the invention define a pair of oppositely disposed and aligned channels 37 which receive a reenforcing member 38 for stiffening the support beads 36 as in the preferred form of the invention. This reenforcing member preferably comprises a rectangular bar or strip of heavy, stiff, paper or cardboard adhesively secured in place in the channels 37 although as in the preferred form of the invention may be made of heavy cord, metal wire, wood, plastic or other suitable material secured in place in any suitable manner.

As in the preferred form of the invention shown in Fig. 2, the modified handle A illustrated in Fig. 3 is provided with the hand opening 21, the material of the legs 34 of the member 11 being cut out along severance lines 41, 42, 43 and folded upwardly toward the upper edges of the legs 34 to produce a pair of contiguous, triple layer carrying or handle bars 45 disposed between and along the top edges of the adhesively secured together legs 34.

In a second modified form of the invention as illustrated in Fig. 4 the handle is formed similar to that shown in Fig. 3 except that of the legs 34 of the carrying member 11 are free and unsecured so that they may be spread apart and hinged outwardly along their connection with the support bead wall sections 33. This permits the legs 34 of the carrying member 11 to be spread out in a flat position against the tops of the containers B when the handle A is applied to the containers as shown in Fig. 6. With such a handle A the container packages may be readily stacked on top of each other without interference from the handles.

In a third modified form of the invention, the handles of the first and second modified forms are further modified as shown in Fig. 5 to incorporate a heavy cord, metal wire, plastic or other suitable material reenforcing element 47 of cylindrical formation. In this third modified form, the carrying member 11 is wrapped around the reenforcing element 47 to produce a cylindrical protuberance along the bottom edge of the member, thus setting off a pair of oppositely disposed beads or support elements 48 extending laterally from opposite sides of the carrying member for container supporting engagement under the ledges G of the containers B as in the preferred form of the invention.

As a preferred or exemplary embodiment of at least one method of producing the reenforced handle A and its modifications, as illustrated in Figs. 7 to 18 inclusive of the drawings, a flat blank 51 (Fig. 7) is first provided. The blank 51 preferably is illustrated with a pair of oppositely disposed handle openings 52 instead of forming the opening and folding the material thereof into the triple layer handle bars 22 shown in Fig. 2, in order to simplify the method steps.

As the second step in the method, the blank 51 is formed with the transversely disposed beads 25 (Fig. 8) which are spaced inwardly from the end edges 15 of the blank, to define the channels 26 in the beads and the pendant portions 27 adjacent the blank edges 15. Simultaneously with this bead forming operation, the blank is formed with a transverse crease line 53 which is located midway beetween the end edges 15 and which provides for subsequent folding of the blank.

After formation of the beads 25 and the crease line 53, a suitable adhesive 54 is applied to the blank, in the channels 26 and on the adjoining faces up to the lower edges of the handle openings 52 and entirely over the pendant portions 27 as shown in Fig. 9. The blank 51 is then folded along the crease line 53 as shown in Fig. 10 to produce the top fold line 12 and thereby provide the carrying member 11 having the legs formed with the oppositely disposed channels 26 in the outwardly extending beads 25. At this stage in the formation of the handle A, the member legs 13 are spread apart as shown in Fig. 10 and the adhesive is disposed on the inner faces of the legs.

The reenforcing element 28 (Fig. 11) is then provided, for assembly with the carrying member 11. This reenforcing element 28 may be precut to length or may be a substantially continuous web or strip cut off to length after assembly with the carrying member. In any event the reenforcing member 28 preferably is inserted loosely into the channels 26 of the carrying member 11 as shown in Fig. 12. This insertion of the reenforcing element 28 may be effected in any suitable manner.

Where the reenforcing elements 28 are precut to length, they may be stacked for example in a magazine 56 (Fig. 13) and fed individually from the bottom of the magazine by a reciprocating stroke bar 57 having a feed dog 58 which advances the reenforcing element into place in the channels 26 of a carrying member 11 held in proper endwise alignment with the magazine as shown in Fig. 13. As another example, Fig. 14 illustrates a device for feeding a continuous strip of reenforcing material into the channels 26 of a carrying member 11 held in proper position. Feeding of the strip preferably is effected by cooperating feed rollers 61, 62. When a full length of the strip is fed into place within the channels 26, it is cut off by cooperating shear blades 63, 64, thereby providing the reenforcing element 28 in the channels.

With the reenforcing element 28 in place in the adhesively coated channels 26, the carrying member legs 13 in the region of the beads 25 are pressed together tightly to compress the beads around the reenforcing element 28 and thus bond the reenforcing element to the carrying member 11. This compression of the carrying member legs 13 may be effected in any suitable manner. As an example, one form of apparatus shown in Fig. 15 for effecting this step, comprises a die mechanism having a pair of movable jaws 65 formed with cooperating oppositely disposed recesses 66 to receive the carrying member 11 and its beads 25, therebetween. When the jaws 65 are moved toward each other, they compress the legs 13 and beads 25 of the carrying member and thus compactly press the beads around the reenforcing element 28 and thus cause the adhesive to bond the element 28 tightly in place in the bead channels 26.

In another form of apparatus, as shown in Fig. 16, compression of the beads 25 tightly around the reenforcing element 28 is effected by a pair of grooved rollers 68 between which the assembled reenforcing element 28 and carrying member 11 as shown in Fig. 12, are passed in any suitable manner. This compression of the beads 25, in any suitable manner results in the completed carrying handle A as shown in Figs. 2 and 17.

If desired, the adhesive may be applied to the reenforcing element 28 instead of the channels 26 to bond these elements together. In such case, rollers similar to the feed rolls 61, 62 may be utilized to apply the adhesive to the reenforcing element as the latter is fed into position in the channels 26.

Instead of folding the blank 51 along its crease line 53 to prealign the channels 26 for the insertion of the reenforcing element 28 thereinto prior to compression of the beads 25, the reenforcing element 28 may be positioned into one of the channels 26 as shown in Fig. 18 and the blank then folded along its crease line 53 to swing the opposite channel 26 in place over the reenforcing element prior to compressing the beads together to bond the reenforcing element in place. This method of assembling the reenforcing element 28 with the carrying member 11 is more readily effected with a heavy cord reenforcing element as shown in Fig. 18. It is also more effective in placing the reenforcing element 28 in the modifications of the handle A as shown in Figs. 3, 4, 5. In these modifications the reenforcing element 28 preferably is positioned in the crease line 53 in the blank, the crease line or the reenforcing element previously having been coated with a suitable adhesive, and the blank folded around the positioned reenforcing element 28 in the same manner as described above, tightly bonds the reenforcing member in place and simultaneously forms or reforms the beads 25 into proper container supporting elements as explained above, and as seen at 48 in Figure 5.

It is thought that the invention and many of its attendant advantages will be understood from the foregoing description, and it will be apparent that various changes may be made in the form, construction and arrangement of the parts and that changes may be made in the steps of the method described and their order of accomplishment without departing from the spirit and scope of the invention or sacrificing all of its material advantages, the form hereinbefore described being merely a preferred embodiment thereof.

I claim:

1. The method of producing a carrying device for a pair of juxtaposed rectangular containers having an encircling tie band therearound, said juxtaposed containers having laterally projecting peripheral ledges thereon with portions of said ledges disposed in opposed contiguous relation, said method comprising forming an intermediate transverse crease line in a flat rectangular blank of flexible sheet material and extending from side to side thereof, forming in the same face of said blank for the full width thereof a pair of outwardly pressed flanges setting off a pair of open channels disposed parallel with and spaced inwardly equidistantly from the end edges of said blank, folding said blank along said intermediate crease line to provide a double layer handle with said channels disposed in opposed aligned face to face relation, and inserting an elongated strip-like reenforcing member into said aligned channels to rigidify said laterally extending flanges for supporting said juxtaposed containers by means of said contiguous ledge portions after said handle has been inserted therebetween.

2. The method of claim 1 including the additional steps of applying an adhesive to said channels and to the immediately adjacent portions of said blank, and pressing said adhesively coated surfaces of the blank together around said reenforcing member to secure said folded handle layer against separation.

3. The method of claim 1 wherein said reenforcing member is a preformed strip which is fed longitudinally into said channels and adhesively secured thereinto.

4. The method of claim 1 wherein said reenforcing member comprises a continuous strip which is inserted longitudinally into said channels and adhesively secured therein, and severing said inserted strip portion from the remainder of said strip.

5. A carrying device for a pair of juxtaposed rectangular containers having an encircling tie band therearound, said containers having laterally projecting peripheral ledges thereon with portions of said ledges disposed in opposed contiguous relation, said carrying device comprising an upstanding handle of integral transversely folded double layer thickness for insertion between said containers, said handle layers having integral opposed transverse support flanges thereon projecting laterally in opposite directions for engagement beneath said contiguous container ledge portions on opposed sides of said handle, said support flanges respectively defining a pair of opposed open channels disposed in aligned face to face relation and extending transversely throughout said handle layers, and a strip-like reenforcing member secured to and extending longitudinally throughout said channels for rigidifying said transverse flanges for container supporting purposes, said double layer thicknesses of the handle being transversely folded downwardly from the top of the handle and extending in face to face relation below said support flanges as a double walled pendant encircled by said tie band to maintain the handle against endwise displacement from between said containers.

6. A carrying device for a pair of juxtaposed rectangular containers having an encircling tie band therearound, said containers having laterally projecting peripheral ledges thereon with portions of said ledges disposed in opposed contiguous relation, said carrying device comprising an upstanding handle of integral transversely folded double layer thickness for insertion between said containers, said handle layers having integral opposed transverse support flanges thereon projecting laterally in opposite directions for engagement beneath said contiguous container ledge portions on opposed sides of said handle, said support flanges respectively defining a pair of opposed open channels disposed in aligned face to face relation and extending transversely throughout said handle layers, and a strip-like reenforcing member secured to and extending longitudinally throughout said channels for rigidifying said transverse flanges for container supporting purposes, said double layer thicknesses of the handle being transversely folded upwardly from the bottom of the handle and said strip-like reenforcing member being disposed within hollow support flanges at the bottom of the handle, said reenforcing member comprising a length of flexible cord adhesively secured within and extending throughout said opposed face to face open channels.

References Cited in the file of this patent

UNITED STATES PATENTS

| | | |
|---|---|---|
| 2,095,139 | Kind | Oct. 5, 1937 |
| 2,164,935 | Meyer | July 4, 1939 |
| 2,680,039 | Burge | June 1, 1954 |
| 2,693,385 | Cavalli et al. | Nov. 2, 1954 |
| 2,694,596 | Greenlaw | Nov. 16, 1954 |
| 2,769,535 | Bruce | Nov. 6, 1956 |
| 2,845,175 | Then | July 29, 1958 |

FOREIGN PATENTS

| | | |
|---|---|---|
| 507,958 | Great Britain | June 23, 1939 |